(12) United States Patent
Allen et al.

(10) Patent No.: US 7,669,491 B2
(45) Date of Patent: Mar. 2, 2010

(54) CURRENT TANK SYSTEMS AND METHODS

(75) Inventors: Donald Wayne Allen, Richmond, TX (US); Dean Leroy Henning, Needville, TX (US); Li Lee, Houston, TX (US); David Wayne McMillan, Deer Park, TX (US); Raghunath Gopal Menon, Katy, TX (US); Christopher Steven West, Pearland, TX (US)

(73) Assignee: Shell Oil Company, Houston, TX (US)

( * ) Notice: Subject to any disclaimer, the term of this patent is extended or adjusted under 35 U.S.C. 154(b) by 335 days.

(21) Appl. No.: 11/685,971

(22) Filed: Mar. 14, 2007

(65) Prior Publication Data
US 2007/0216285 A1    Sep. 20, 2007

Related U.S. Application Data

(60) Provisional application No. 60/782,209, filed on Mar. 14, 2006.

(51) Int. Cl.
*G01M 10/00*    (2006.01)

(52) U.S. Cl. .................................................. 73/866.4
(58) Field of Classification Search .................. None
See application file for complete search history.

(56) References Cited

U.S. PATENT DOCUMENTS

| 5,866,813 | A | 2/1999 | Nakaya et al. ............... 73/147 |
| 6,923,051 | B2 * | 8/2005 | Fleming ....................... 73/147 |
| 2002/0083763 | A1 | 7/2002 | Li ................................ 73/147 |
| 2003/0089167 | A1 | 5/2003 | Markstaller et al. .......... 73/147 |
| 2003/0175820 | A1 | 9/2003 | Smith et al. .................. 435/7.2 |

OTHER PUBLICATIONS

TH3009 PCT, PCT/US07/63761, International Search Report dated Mar. 14, 2008.

* cited by examiner

*Primary Examiner*—Hezron Williams
*Assistant Examiner*—Alex Devito
(74) *Attorney, Agent, or Firm*—William E. Hickman (57) ABSTRACT

There is disclosed a current tank system comprising a first current tank adapted to produce a first current in a first direction; a second current tank adapted to rotate to produce a second current in a second direction; a sample adapted to be exposed to the first current and the second current.

16 Claims, 7 Drawing Sheets

CURRENT TANK SYSTEMS AND METHODS

RELATED APPLICATIONS

This application claims priority to U.S. Provisional Application 60/782,209, filed on Mar. 14, 2006. U.S. Provisional Application 60/782,209 is herein incorporated by reference in its entirety.

FIELD OF THE INVENTION

This application relates to current tanks which may be used to expose a sample to a flowing fluid.

BACKGROUND

Current tanks and wind tunnels have been used to test the effects of a flowing fluid on a test apparatus.

U.S. Pat. No. 5,866,813 discloses a transportable three-dimensional calibration wind tunnel system which is comprised of a small wind tunnel portion for creating a three-dimensional calibration air having a suitable wind velocity, and a two-axis rotational deformation device portion for causing said wind tunnel portion to effect a conical motion with a nozzle blow port being an apex to suitably change a flow angle. The two-axis rotational deformation device is comprised of a B-angle rotational deformation device having a B-angle deformation base supported to be rotated horizontally, and an A-angle rotational deformation device having an A-angle deformation base supported to be rotated vertically. A rotational axis of the A-angle deformation base, a rotational axis of the B-angle deformation base and a center axis of the small wind tunnel portion are arranged so that they intersect at a point. In a method for the verification of a flight control system of an aircraft using the transportable three-dimensional calibration wind tunnel system, the nozzle blow port of the three-dimensional calibration wind tunnel system is positioned at the extreme end of an air data sensor probe provided on the aircraft, and the three-dimensional calibration wind tunnel system and an on-board control computer of the aircraft are connected to an out-board control computer so that a suitable three-dimensional airflow is generated by the three-dimensional calibration wind tunnel system to verify the operation and function of the control surface in the stopped state on the ground.

Co-pending patent application having Ser. No. 60/771,647, was filed Feb. 9, 2006, and discloses a current tank system comprising a first current tank adapted to produce a first current in a first direction, and a second current tank adapted to produce a second current in a second direction. There is also disclosed a method of testing a sample, comprising exposing the sample to a first current in a first current tank, and exposing the sample to a second current in a second current tank. Patent application having Ser. No. 60/771,647 is herein incorporated by reference in its entirety.

Current tanks and wind tunnels have the limitation that they are not able to create multi-dimensional flow as would be encountered if an apparatus were subjected to multi-dimensional air currents and/or water currents. There is a need in the art to simulate multi-dimensional flow.

SUMMARY OF THE INVENTION

One aspect of the invention provides a current tank system comprising a first current tank adapted to produce a first current in a first direction; a second current tank adapted to rotate to produce a second current in a second direction; a sample adapted to be exposed to the first current and the second current.

Another aspect of the invention provides a method of testing a sample, comprising exposing the sample to a first current in a first current tank; rotating a second current tank to create a second current; and exposing the sample to the second current in the second current tank.

Advantages of the invention include one or more of the following:

exposing a sample to multi-directional current;

modeling a real world multi-directional current in a current tank;

exposing a sample to multi-directional currents with different fluids; and/or exposing a sample to multi-directional currents with changing directions of the currents.

DETAILED DESCRIPTION

In one embodiment, there is disclosed a current tank system comprising a first current tank adapted to produce a first current in a first direction; a second current tank adapted to rotate to produce a second current in a second direction; a sample adapted to be exposed to the first current and the second current. In some embodiments, the second current tank is mounted above the first current tank. In some embodiments, one or more of the first and second current tanks are provided with a sealed cover to prevent a fluid from flowing from one of the current tanks to the other. In some embodiments, the first direction and the second direction are separated by an angle from 30 to 180 degrees. In some embodiments, the first direction and the second direction are separated by an angle from 60 to 120 degrees. In some embodiments, the system also includes a test sample exposed to the first current and the second current. In some embodiments, the first current tank further comprises one or more propellers. In some embodiments, the second current tank further comprises a central rod. In some embodiments, the system also includes one or more shear screens, straighteners, and/or turbulence reduction screens. In some embodiments, the second current tank is adapted to be rotated relative to the first current tank and the sample. In some embodiments, the system also includes a fluid selected from water, air, brine, and other water based mixtures.

In one embodiment, there is disclosed a method of testing a sample, comprising exposing the sample to a first current in a first current tank; rotating a second current tank to create a second current; and exposing the sample to the second current in the second current tank. In some embodiments, the first current and the second current are separated by an angle from 30 to 180 degrees. In some embodiments, the first current and the second current are separated by an angle from 60 to 120 degrees. In some embodiments, the method also includes producing the first current with one or more propellers. In some embodiments, the method also includes producing the second current by rotating the second current tank by driving it with an engine or a motor. In some embodiments, the method also includes rotating the second current tank relative to the first current tank and the sample. In some embodiments, the method also includes exposing the sample to a third current in a third current tank. In some embodiments, the method also includes measuring a response of the sample to the currents.

Figure 1:
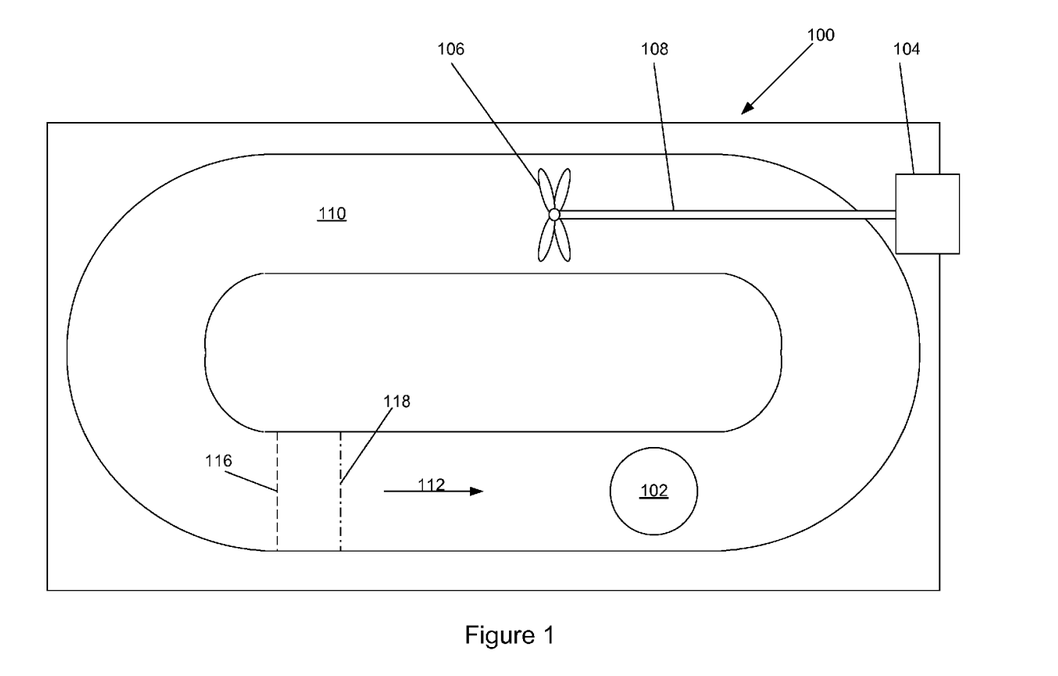
FIG. 1 illustrates a top view of a current tank system.

Referring now to FIG. 1, in one embodiment of the invention, there is illustrated a top view of system 100. System 100 includes current tank 110 with current 112. Current 112 is driven with propeller 106 mounted to drive shaft 108 rotated by propulsion system 104, for example, an engine or a motor. Test sample 102 is placed in tank 110 and subjected to current 112.

In some embodiments, shear screen 116 and/or straightener 118 may be provided. In some embodiments, various forms of measurement devices and/or instrumentation may be provided to measure the effects of current 112 on test sample 102. In some embodiments, propeller 106, drive shaft 108, and propulsion system 104 may be replaced with a turbine, a paddle wheel, a fan blade, or other fluid conveying devices as are known in the art.

Figure 2:
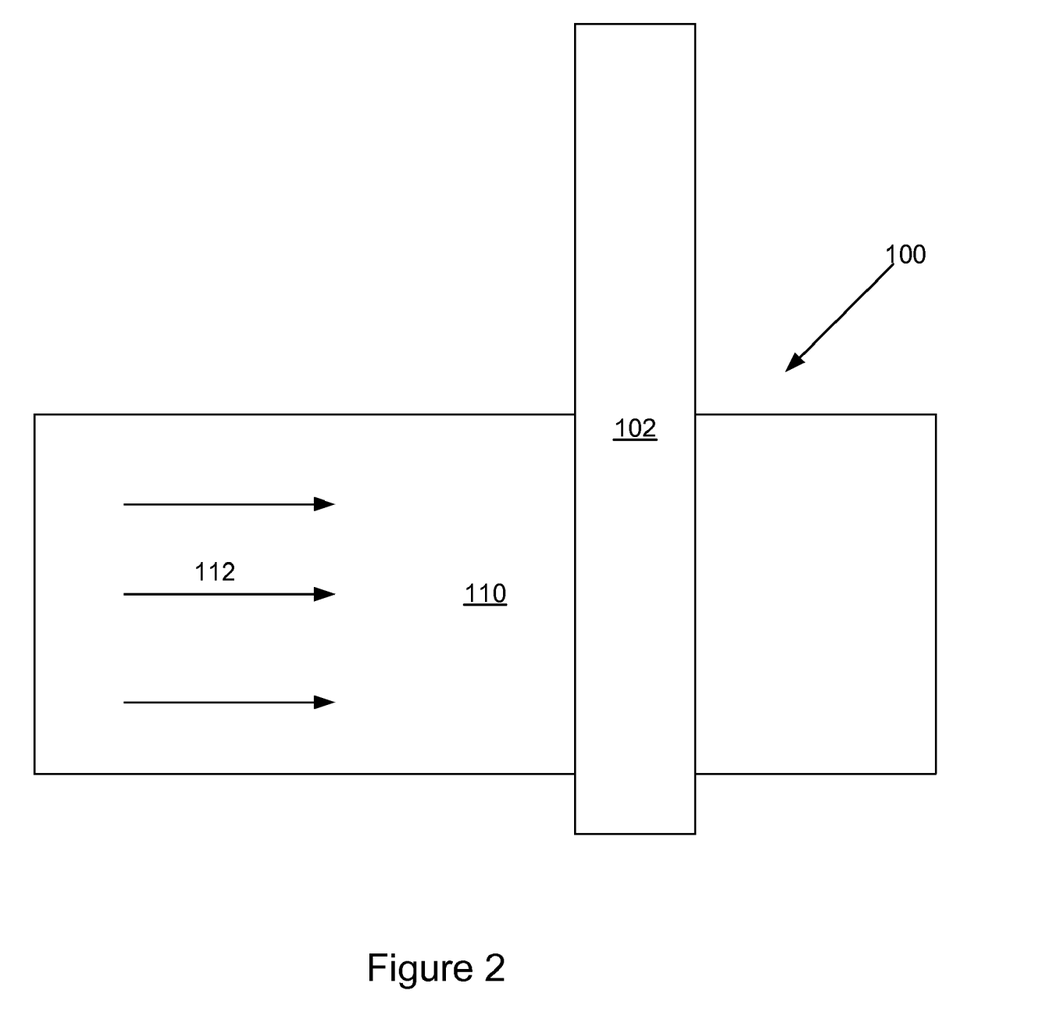
FIG. 2 illustrates a side view of a current tank system.

Referring now to FIG. 2, in some embodiments, a side view of system 100 is shown where test sample 102 is shown in current tank 110 subjected to current 112.

Figure 3:
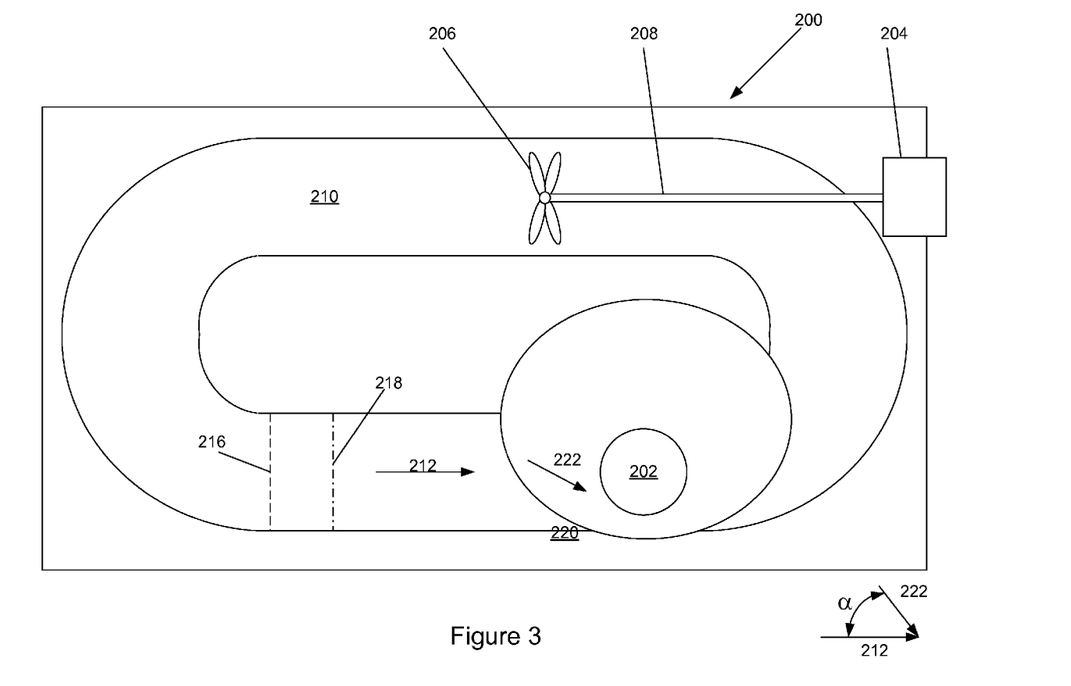
FIG. 3 illustrates a top view of a current tank system.

Referring now to FIG. 3, in some embodiments, system 200 is shown. System 200 includes current tank 210 with current 212, and current tank 220 with current 222. Sample 202 is placed in both current tank 210 and current tank 220. System 200 includes current tank 210 with propeller 206 mounted on shaft 208, which may be rotated by propulsion system 204. Shear screen 216 and/or straightener 218 may be provided in current tank 210. Current tank 220 includes a system (not shown) to create current 222.

In some embodiments, one or more of current tank 210 and/or current tank 220 may be provided with a sealed cover so that the fluid from current tank 220 does not flow into current tank 210, or vice versa, due to gravity. In some embodiments, current tank 210 may be placed on top of current tank 220. In other embodiments, current tank 220 may be placed on top of current tank 210. In some embodiments, current 212 may be offset from current 222 by an angle α (from about +/−30 to about +/−180 degrees, for example from about +/−60 to about +/−120 degrees. In some embodiments, straightener 218 may be a turbulence reduction screen.

Figure 4:
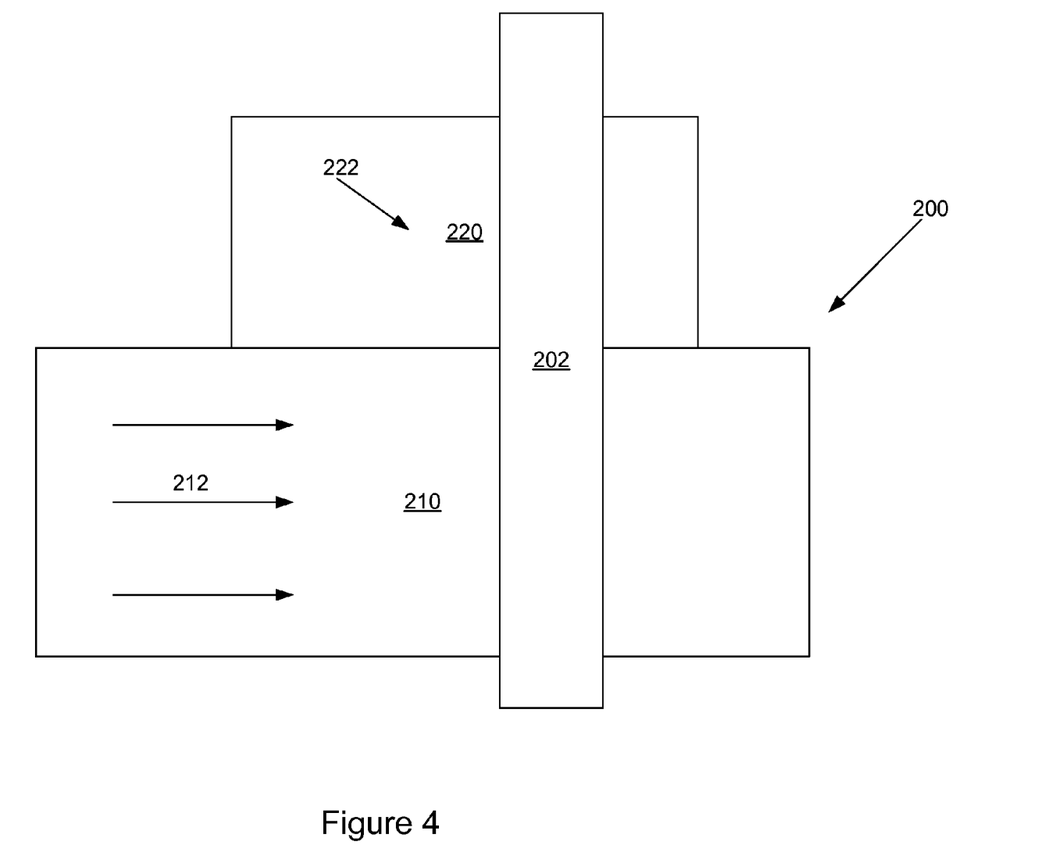
FIG. 4 illustrates a side view of a current tank system.

Referring now to FIG. 4, in some embodiments, a side view of current tank 220 mounted on top of current tank 210. Current tank 210 has current 212, and current tank 220 has current 222. Sample 202 is placed in both current tank 210 and current 220 and subjected to both current 212 and current 222.

Figure 5:
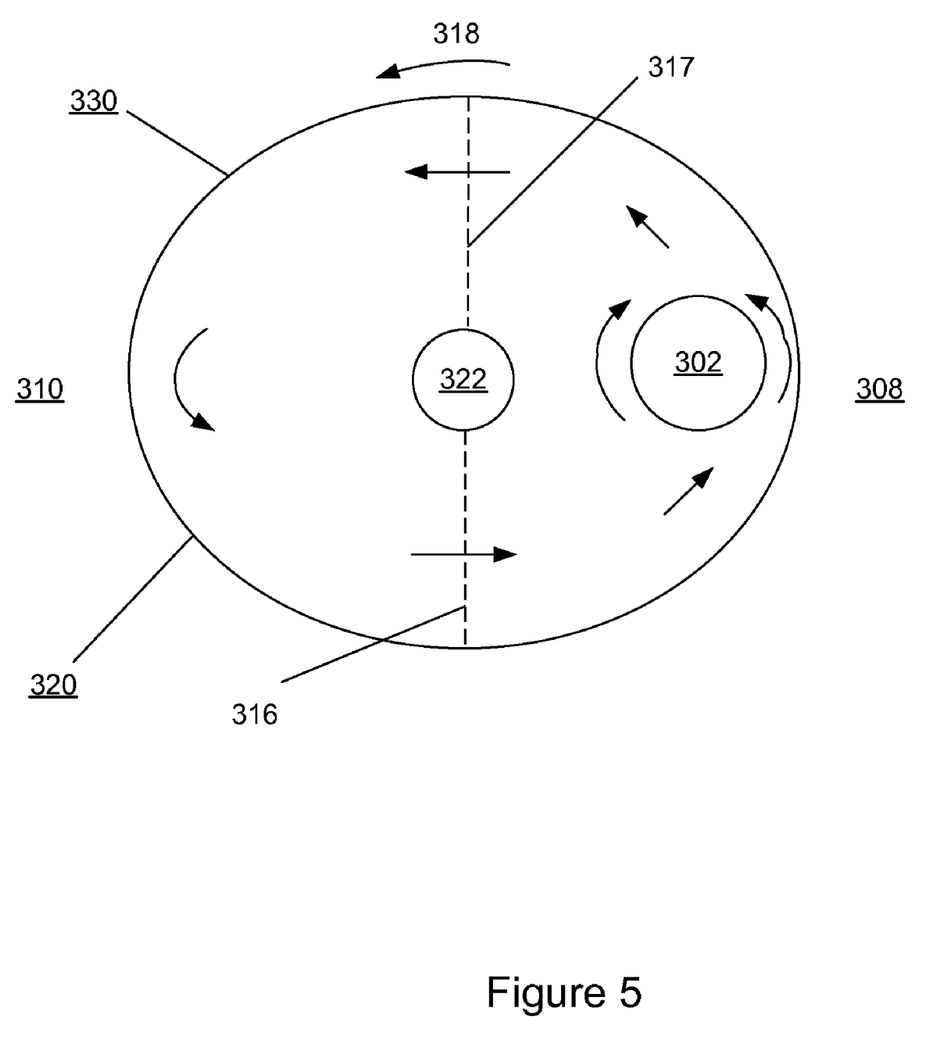
FIG. 5 illustrates a top view of a current tank.

Referring now to FIG. 5, in some embodiments, current tank 320 is illustrated. Sample 302 has been placed in cylinder 330. Current 322 is created in cylinder 330 by rotating cylinder 330 in the direction shown by arrow 318. Rod 332 may be provided in cylinder 330 to help direct and/or centralize flow 322. Primary screen 316, for example a shear and/or a turbulence reduction screen may be provided. Secondary screen 317, for example a shear and/or a turbulence reduction screen may be provided.

In some embodiments, current tank 320 may be rotated clockwise or counter-clockwise (as shown by arrow 318), in order to create current flow 322 relative to sample 302. The rotation of cylinder 330 may create current 322 to flow around rod 332.

Figure 6:
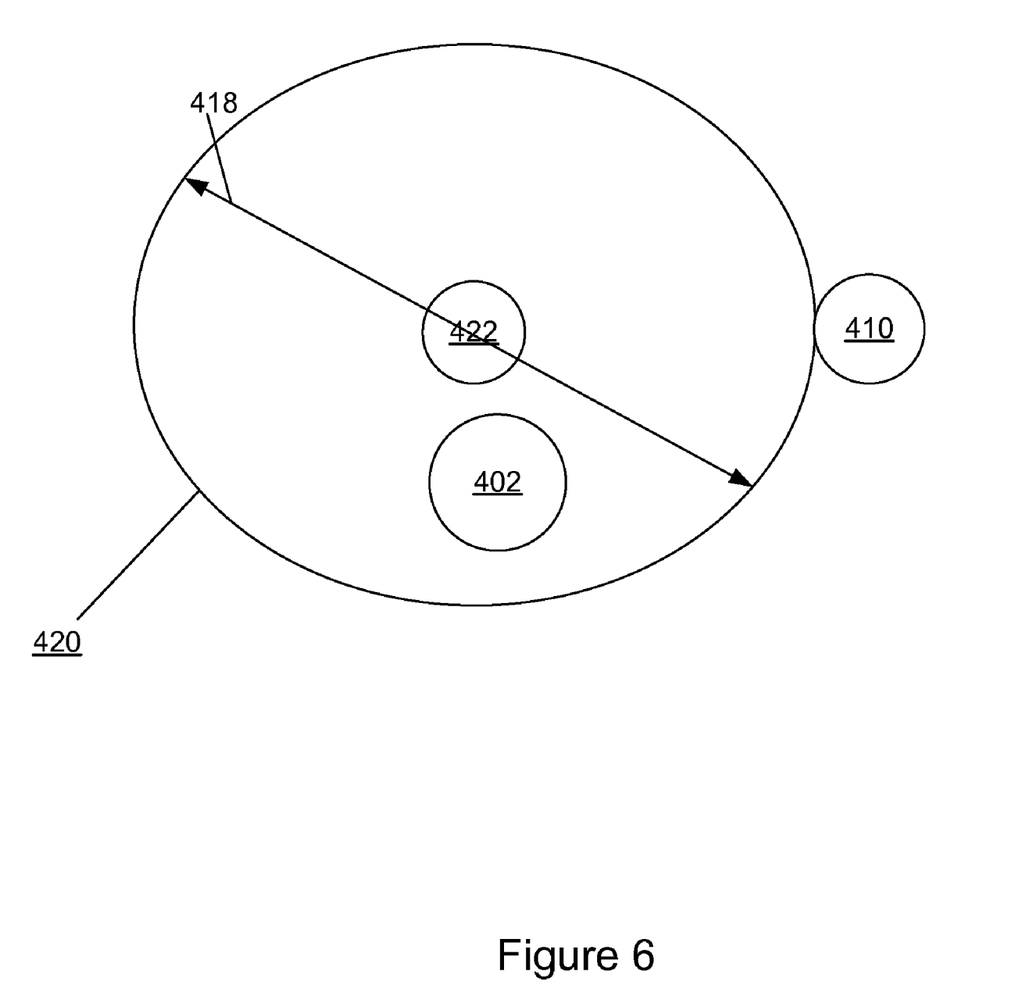
FIG. 6 illustrates a top view of a current tank.

Referring now to FIG. 6, in some embodiments, current tank 420 is illustrated. Current tank 420 has a tank diameter 418. Current tank 420 has rod 422 and sample 402. Driving wheel 410 may be included to rotate current tank 420. Current tank 420 and driving wheel 410 may both include mating gears to prevent relative motion between them. Current tank 420 and driving wheel 410 may also rely on frictional surfaces for driving wheel 410 to rotate current tank 420. Driving wheel 410 may be connected to an engine or motor. Alternatively, a drive belt or chain (not shown) may be looped around current tank 420 and connected to an engine or motor to rotate current tank 420. Other mechanical means as are known in the art may also be used to rotate current tank 420. Current tank 420 has a height (not shown).

In some embodiments, tank diameter 418 is from about 1 meter to about 5 meters, for example about 2 meters. In some embodiments, tank height is from about 1 meter to about 10 meters, for example about 2½ meters.

In some embodiments, current tank 220 may be replaced with current tank 320 or current tank 420.

In some embodiments, current tank 210 and/or current tank 220 contain a fluid selected from water, air, and brine or other water based mixtures.

Figure 7:
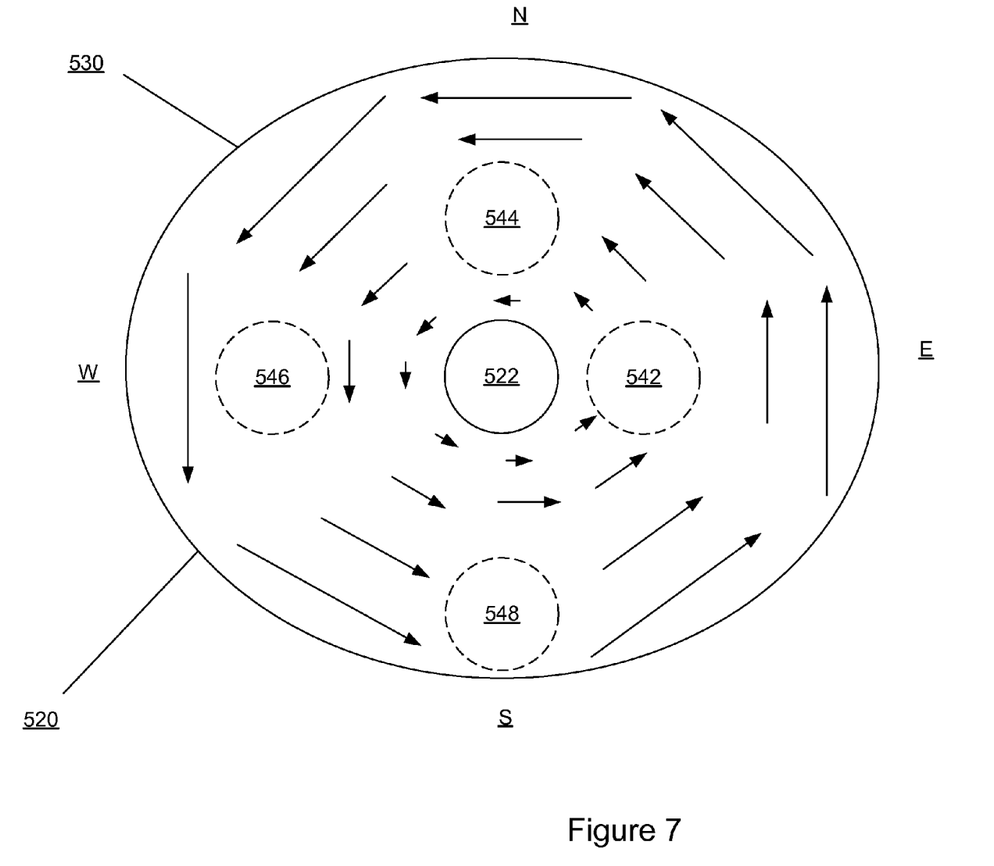
FIG. 7 illustrates a top view of a current tank.

Referring now to FIG. 7, in some embodiments, current tank 520 is illustrated, which includes cylinder 530. The currents are created in cylinder 530 by rotating cylinder 530 in a counterclockwise direction. The speed and direction of the currents are illustrated with the arrows in cylinder 530. Rod 532 may be provided in cylinder 530 to help direct and/or centralize the currents. A primary screen, for example a shear and/or a turbulence reduction screen may be provided. A secondary screen, for example a shear and/or a turbulence reduction screen may also be provided.

As shown in FIG. 7, current tank 520 is oriented with the top North, the bottom South, the right side East, and the left side West. Of course, current tank 520 may be oriented in any direction to achieve the same results.

If a sample is placed at location 542, the sample will be exposed to a low velocity south to north current. If a sample is placed at location 544, the sample will be exposed to a medium velocity east to west current. If a sample is placed at location 546, the sample will be exposed to a high velocity north to south current. If a sample is placed at location 548, the sample will be exposed to a very high velocity west to east current.

Those skilled in the art will realize that any given current velocity and direction can be achieved by how fast cylinder 530 is rotating, how close the sample is to rod 532 (with velocity increasing with increasing distance from rod 532), and where sample is located with respect to North, East, South, and West controlling the direction of the current.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A current tank system comprising: a first current tank adapted to produce a first current in a first direction; a second current tank adapted to rotate relative to the first current tank and a sample to produce a second current in a second direction; and the sample is positioned to be exposed to the first current and the second current.

2. The system of claim 1, wherein the second current tank is mounted above the first current tank.

3. The system of claim 1, wherein one or more of the first and second current tanks are provided with a sealed cover to prevent a fluid from flowing from one of the current tanks to the other.

4. The system of claim 1, wherein the first direction and the second direction are separated by an angle from 30 to 180 degrees.

5. The system of claim 1, wherein the first direction and the second direction are separated by an angle from 60 to 120 degrees.

6. The system of claim 1, wherein the first current tank further comprises one or more propellers.

7. The system of claim 1, wherein the second current tank further comprises a central rod.

8. The system of claim 1, further comprising one or more shear screens, straighteners, and/or turbulence reduction screens.

9. The system of claim 1, further comprising a fluid selected from water, air, brine, and other water based mixtures.

10. A method of testing a sample, comprising: exposing the sample to a first current in a first current tank; rotating a second current tank relative to the first current tank and the sample to create a second current; and exposing the sample to the second current in the second current tank.

11. The method of claim 10, wherein the first current and the second current are separated by an angle from 30 to 180 degrees.

12. The method of claim 10, wherein the first current and the second current are separated by an angle from 60 to 120 degrees.

13. The method of claim 10, further comprising producing the first current with one or more propellers.

14. The method of claim 10, further comprising producing the second current by rotating the second current tank by driving it with an engine or a motor.

15. The method of claim 10, further comprising exposing the sample to a third current in a third current tank.

16. The method of claim 10, further comprising measuring a response of the sample to the currents.

* * * * *